United States Patent
Chou

(10) Patent No.: US 7,046,297 B2
(45) Date of Patent: May 16, 2006

(54) MULTI-FUNCTIONAL IMAGE FETCHING MODULE

(75) Inventor: Kuan-Yu Chou, Taipei (TW)

(73) Assignee: Inventec Corporation, Taipei (TW)

( * ) Notice: Subject to any disclaimer, the term of this patent is extended or adjusted under 35 U.S.C. 154(b) by 616 days.

(21) Appl. No.: 09/983,458

(22) Filed: Oct. 24, 2001

(65) Prior Publication Data

US 2003/0076439 A1    Apr. 24, 2003

(51) Int. Cl.
*H04N 5/225*    (2006.01)
(52) U.S. Cl. .................. 348/375; 348/376; 348/552
(58) Field of Classification Search ............ 348/207.1, 348/373–376, 552; D14/315, 317, 202, 211, D14/212
See application file for complete search history.

(56) References Cited

U.S. PATENT DOCUMENTS 4,493,541 A * 1/1985 Ohmura et al. ............. 396/424
4,493,542 A * 1/1985 Ohmura et al. ............. 396/424
4,939,580 A * 7/1990 Ishikawa et al. ............ 348/373
5,801,919 A * 9/1998 Griencewic ................. 361/683
6,023,241 A * 2/2000 Clapper ................. 342/357.13
6,323,902 B1 * 11/2001 Ishikawa .................... 348/373
6,417,884 B1 * 7/2002 Chang et al. ............... 348/373
6,462,954 B1 * 10/2002 Kuo et al. .................. 361/752
6,587,151 B1 * 7/2003 Cipolla et al. .............. 348/373
6,687,518 B1 * 2/2004 Park ..................... 379/433.01
6,741,287 B1 * 5/2004 Fuchimukai et al. ....... 348/373
2002/0044216 A1 * 4/2002 Cha .......................... 348/376

* cited by examiner

*Primary Examiner*—Ngoc-Yen Vu
*Assistant Examiner*—Carramah J. Quiett
(74) *Attorney, Agent, or Firm*—Bacon & Thomas, PLLC

(57) ABSTRACT

A multi-functional image fetching module inserted in a slot of an electronic device comprises a body having a recess, a first housing and a second housing both slidingly received in the recess, the first housing having a hinge for coupling to the second housing so that the first housing is capable of pivoting about the second housing for fetching an image through an image fetching module installed therein, and a switching knob for moving a latched member from the second housing to let the first housing spring out of the recess.

5 Claims, 5 Drawing Sheets

MULTI-FUNCTIONAL IMAGE FETCHING MODULE

FIELD OF THE INVENTION

The present invention relates to image fetching devices and more particularly to a multi-functional image fetching module with improved characteristics.

BACKGROUND OF THE INVENTION

Currently, cameras have become convenient and effective means for processing data in this rapidly changing information age. Accordingly, it is often that a camera is mounted on an electronic device such as one of a variety of portable communication devices, PCs, and computer peripherals. Thus, user may manipulate camera and electronic device to perform video information communication. Further, user may perform in one of a variety of operating modes by controlling the camera. As a result, user may conveniently use the electronic device. In view of this, it is important for one skilled in the art to configure a camera so as to maximize its capability.

For a typical camera product such as camera, image fetching device, etc., in the case of taking picture in one of a variety of angles, a camera mounted on electronic device only is capable of taking picture in one direction. Also, wire of camera is required to electrically couple to that of electronic device. Hence, camera is limited in available operating modes. To the worse, camera tends to damage. As a result, predetermined features of camera are adversely affected. Moreover, user cannot perform in one of a variety of operating modes on the electronic device. In view of above, in practice conventional cameras are limited in applications. Thus, it is desirable to provide a multi-functional image fetching module so that an electronic device equipped with an image fetching module may still preserve its appearance. Further, the features of respective electronic device and camera are combined together to provide a more convenient operation and powerful capabilities. Whereby, the above drawbacks of prior art are overcome.

SUMMARY OF THE INVENTION

It is therefore an object of the present invention to provide a multi-functional image fetching module wherein the image fetching module is inserted in an expansion slot of an electronic device for fetching an image through image fetching module. In using the image fetching module, user may push a switching knob to move a latched member so as to clear the latched member from a second housing. In response, an image fetching lens is sprung out of a first housing. Further, the first housing is capable of pivoting to a desired angle. Thereafter, the image fetching lens is operative to take a picture. In an unused state, slide the first and the second housings into a recess for latching the latched member in an end of the second housing and receiving the latched member in the recess. It is important that an appearance of the mounted electronic device is still well preserved.

It is another object of the present invention to provide a multi-functional image fetching module, wherein the image fetching module is mounted on a support device having a wire extended therefrom to electrically couple to an external electronic device so as to operate image fetching module to perform a desired job directly. Moreover, a blue-tooth module is mounted on the image fetching module such that image fetching module is capable of communicating video information with external devices in a wireless manner.

The above and other objects, features and advantages of the present invention will become apparent from the following detailed description taken with the accompanying drawings.

DETAILED DESCRIPTION OF THE PREFERRED EMBODIMENTS

Figure 1:
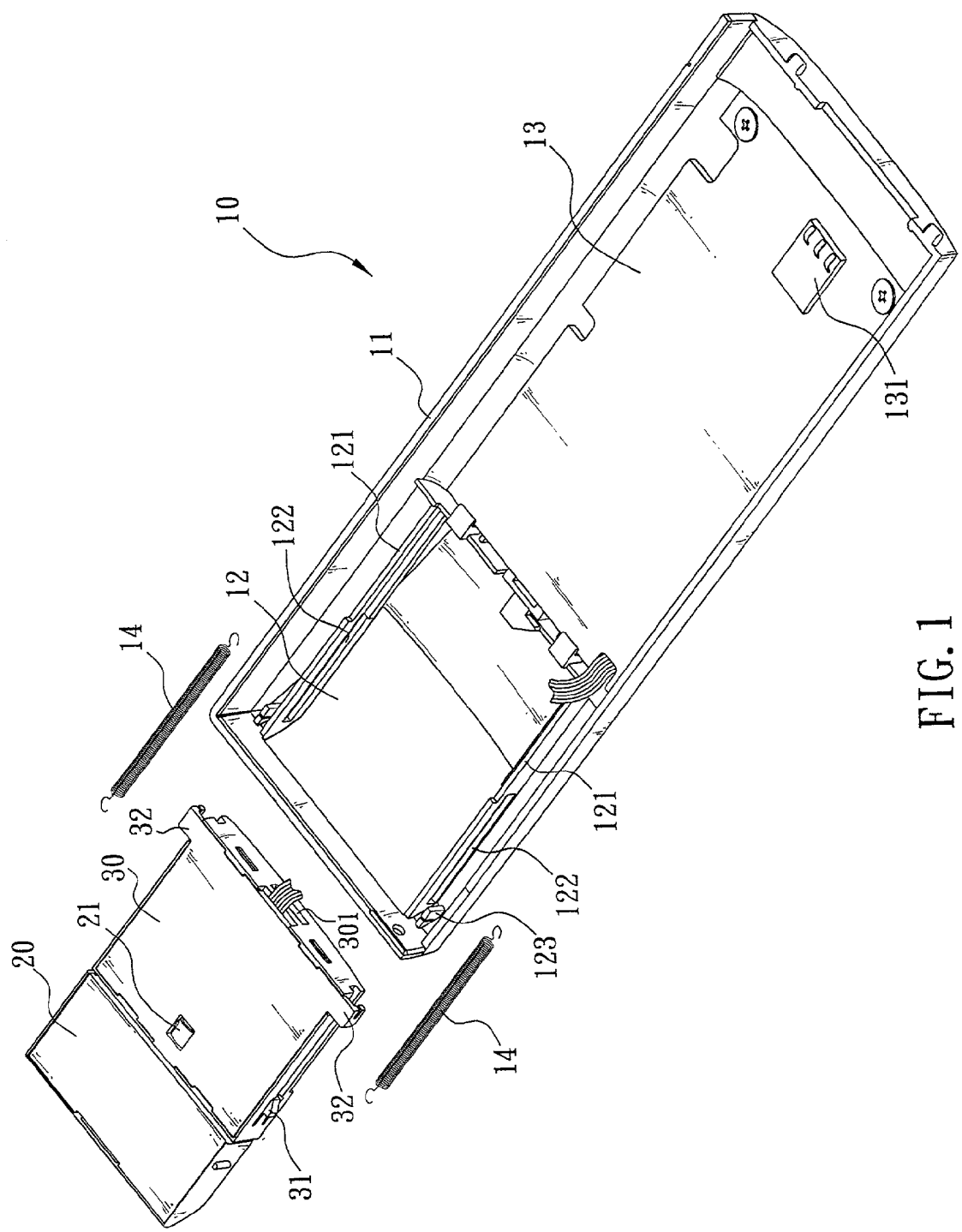
FIG. 1 is an exploded view of a multi-functional image fetching module according to the invention.
Figure 2:
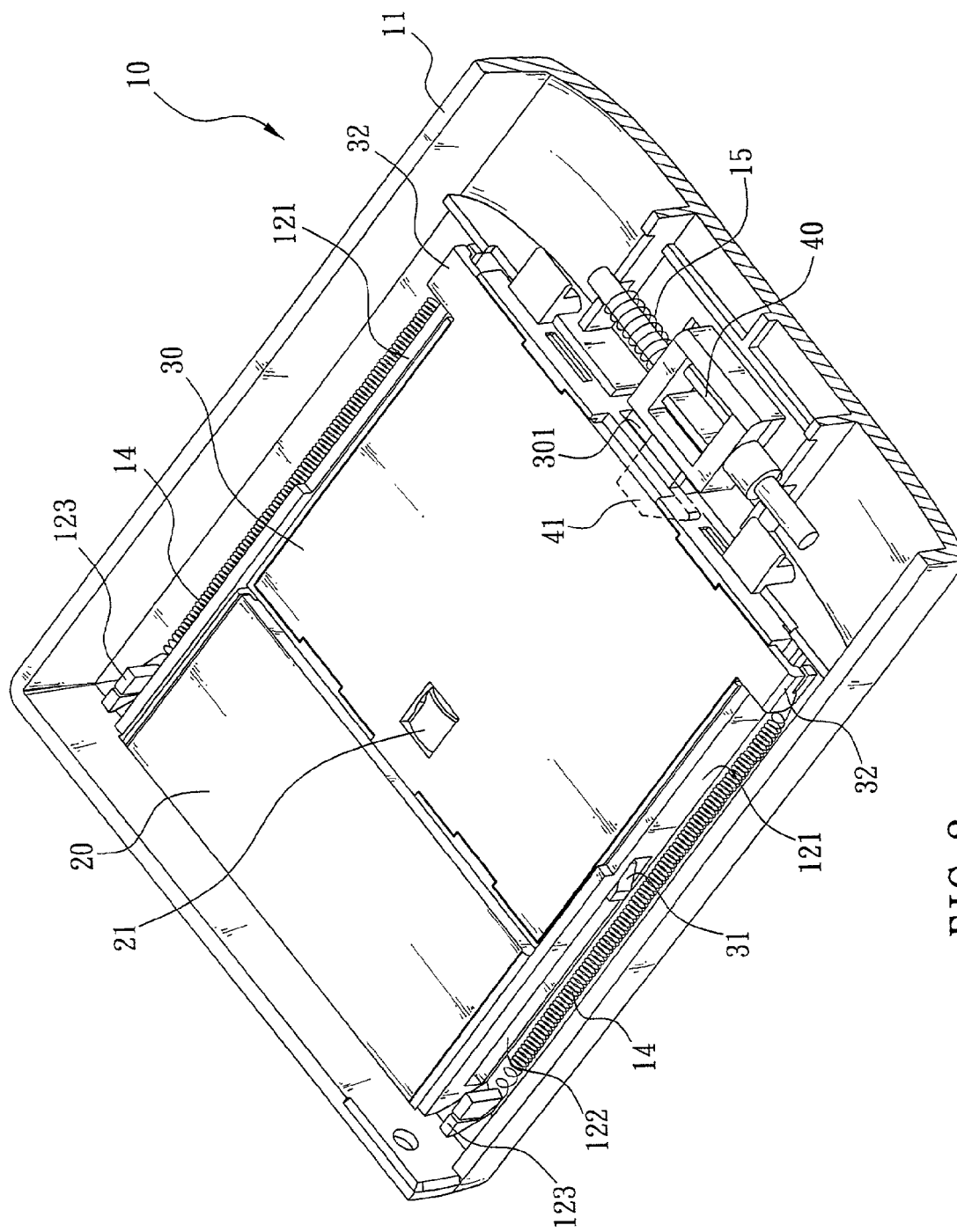
FIG. 2 is a perspective view of FIG. 1 image fetching module.
Figure 3:
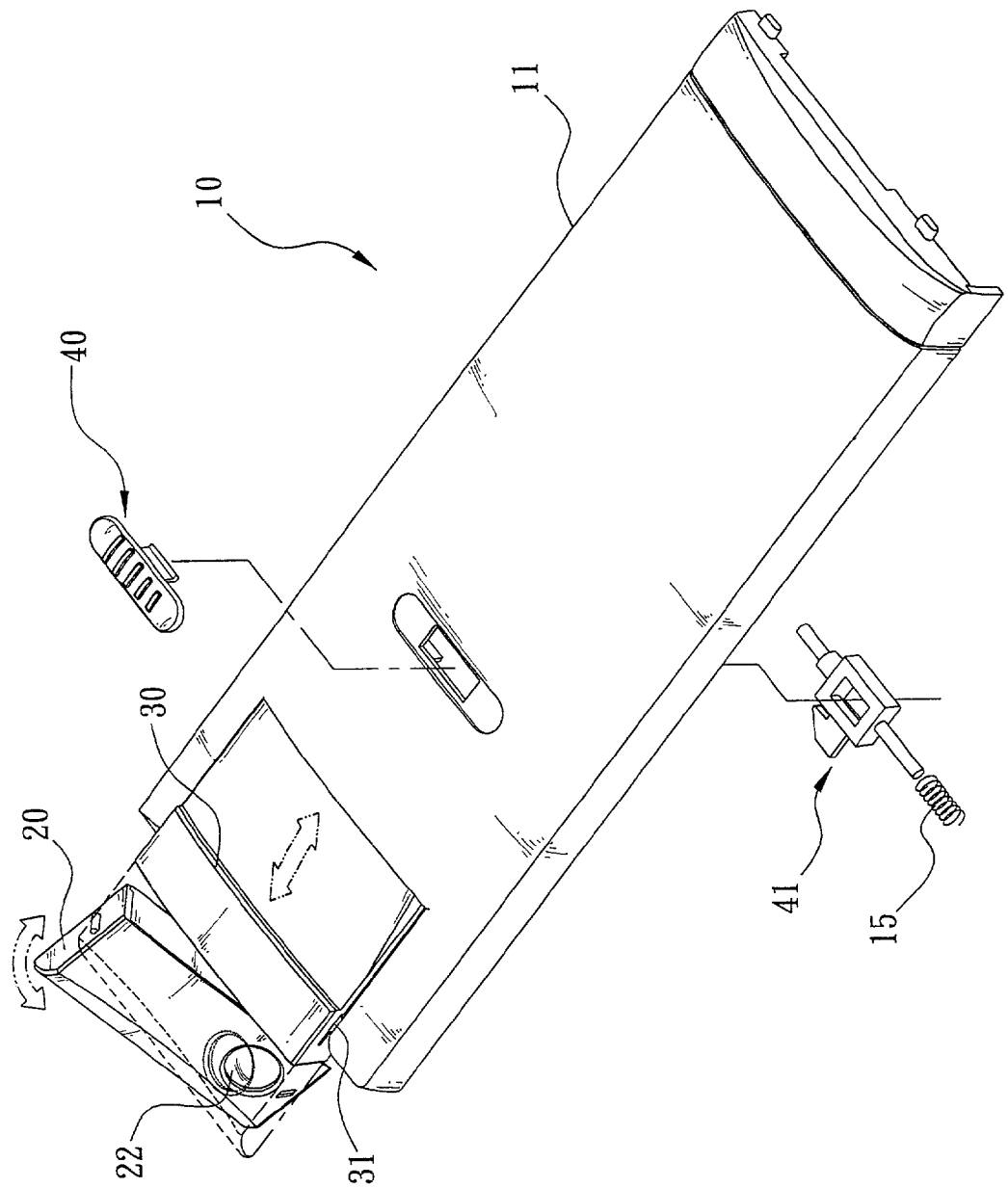
FIG. 3 is a schematic perspective view illustrating an operation of FIG. 1 image fetching module.

Referring to FIGS. 1 to 3, there is shown a multi-functional image fetching module 10 constructed in accordance with the invention comprising an elongate body 11 having a recess 12 on one end, an image processing circuit board 13 on the other end having a connector 131 on top, a first housing 20, and a second housing 30 both slidingly received in recess 12. First and second housings 20 and 30 are coupled together by a hinge 21. As such, first housing 20 may be pivoted to one of desired angles about second housing 30 (FIG. 3). First housing 20 has an image fetching lens 22 coupled to image processing circuit board 13. Hence, image fetching lens 22 is operative to take a picture after first housing 20 being pivoted to a desired angle.

In the invention, a rail 121 is provided on either side of recess 12 (FIGS. 1 and 2). A groove 122 is provided on front portion of each rail 121. Slide member 31 and tab 32 are provided on the front and rear portions of either side of second housing 30 respectively. Hence, tabs 32 are slidable along rails 121 and slide members 31 are slidable along grooves 122 respectively. With this configuration, second housing 30 may be positioned after sliding into place (FIGS. 2 and 3).

In the invention, a stop 123 is provided on front end of each groove 122. A first elastic member 14 has one end affixed to each stop 123 and the other end affixed to each tab 32 (FIG. 2). As such, first and second housings 20 and 30 together are capable of sliding in recess 12 by the compression and expansion of first elastic member 14 (FIG. 3).

In the invention, there is further provided a switching knob 40 projected from back of body 11. A latched member 41 is controlled by switching knob 40 for latching in a hole 301 on one end of second housing 30 (FIGS. 1 to 3). A second elastic member 15 is put on one portion of latched member 41. Thus, a pushed switching knob 40 may return to its original position by the expansion of second elastic member 15. When latched member 41 is moved toward second elastic member 15 by pushing switching knob 40, a secured latched member 41 may clear from hole 301 of second housing 30. Then both first and second housings 20 and 30 are slid along rails 121 by the elasticity of first elastic members 14. Finally, slide members 31 are positioned on front walls of grooves 122, thereby springing image fetching lens 22 out of first housing 20. To the contrary, in an opposite operation after first and second housings 20 and 30 have been received in recess 12, a latching operation is performed on latched member 41 with respect to hole 301 of second housing 30. As a result, first and second housings 20 and 30 are received in recess 12.

Figure 4:
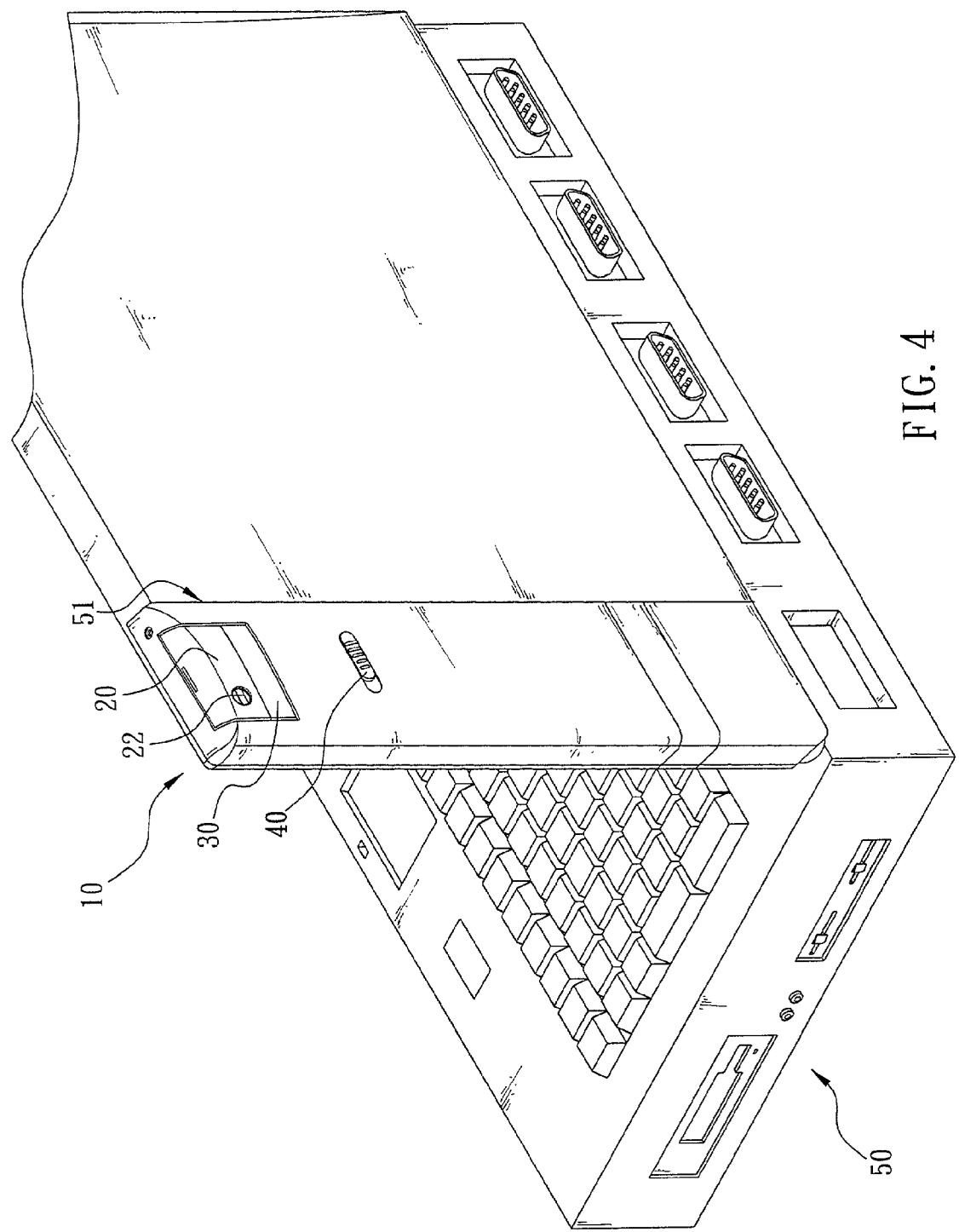
FIG. 4 is a perspective view of a multi-functional image fetching module mounted on a notebook computer according to a first preferred embodiment of the invention.

Referring to FIG. 4, there is shown an image fetching module 10 mounted on an electronic device (e.g., notebook computer as shown) 50 according to a first preferred embodiment of the invention. In detail, image fetching module 10 is inserted in an expansion slot 51 on rear of display screen of notebook computer 50, wherein a connector 131 of image fetching module 10 is coupled to a connector (not shown) in expansion slot 51. With this configuration, user may operate notebook computer 50 to perform a desired job through image fetching module 10.

Figure 5:
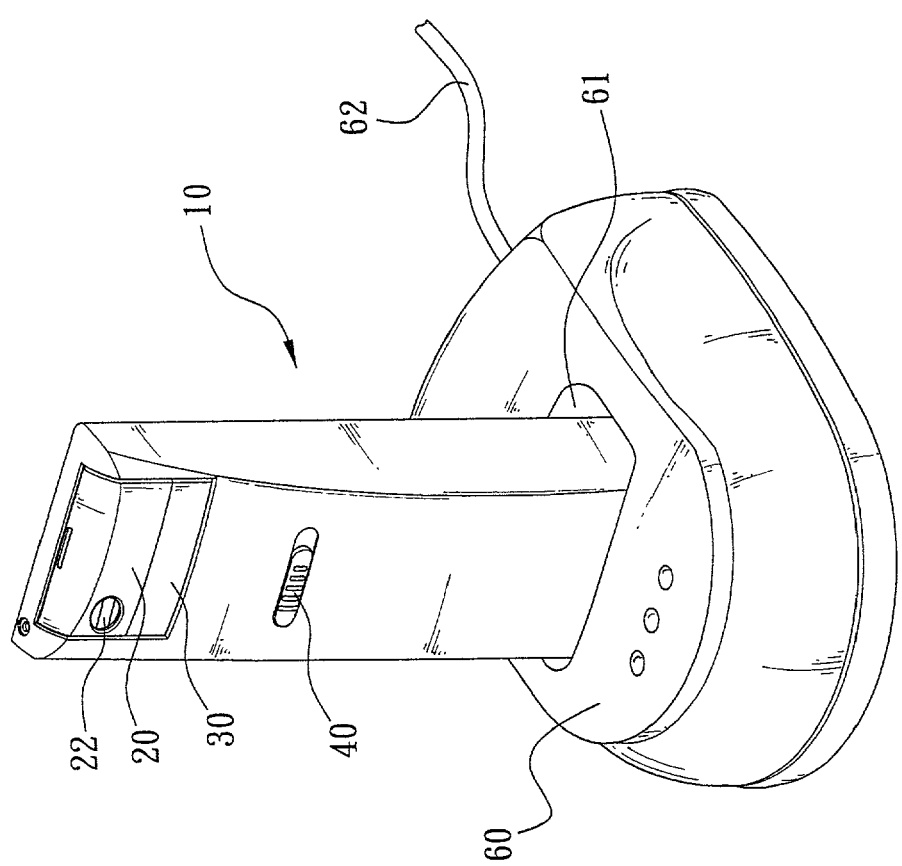
FIG. 5 is a perspective view of a multi-functional image fetching module mounted on a support device according to a second preferred embodiment of the invention.

Referring to FIG. 5, there is shown an image fetching module 10 mounted on an electronic device (e.g., support device as shown) 60 according to a second preferred embodiment of the invention. In detail, image fetching module 10 is inserted in a socket 61 on top of support device 60 wherein a connector 131 of image fetching module 10 is coupled to a connector (not shown) in socket 61 and a wire 62 is extended from support device 60 to electrically couple to another electronic device (not shown). With this configuration, user may operate image fetching module 10 to perform a desired job directly. In the invention, a blue-tooth module may be mounted on image processing circuit board 13 such that image fetching module 10 may communicate video information with external devices in a wireless manner.

With above configuration, when user uses image fetching module 10, user may push switching knob 40 to move latched member 41 so as to clear latched member 41 from second housing 30. In response, image fetching lens 22 is sprung out of first housing 20. Further, first housing 20 is capable of pivoting to a desired angle. Thereafter, image fetching lens 22 is operative to take a picture. In an unused state, slide first and second housings 20 and 30 into recess 12 for latching latched member 41 in the end of second housing 30 (i.e., received in recess 12). It is important to note that the appearance of the mounted device is still well preserved.

While the invention has been described by means of specific embodiments, numerous modifications and variations could be made thereto by those skilled in the art without departing from the scope and spirit of the invention set forth in the claims.

What is claimed is:

1. A multi-function image fetching module comprising:
a body having a recess on one end and an image processing circuit board on the other end having a connector thereon;
a first housing and a second housing both slidingly received in the recess, the first housing having a hinge for coupling to the second housing so that the first housing is capable of pivoting about the second housing, and the first housing further including an image fetching lens coupled to the image processing circuit board;
a latch arranged to extend into a hole in the second housing for securing said first housing and second housing in said recess of the body when said first housing and said second housing are pushed into said recess;
a switching knob for releasing said latch;
a first elastic member for causing said first and second housings to extend out of said recess when said switching knob is manipulated to release said latch; and
a second elastic member for causing said latch to return to a latching position upon release of said switching knob,
wherein the image fetching module is secured in an expansion slot of a first electronic device, and
wherein the image fetching module further comprises a connector coupled to connector means in the expansion slot so that the first electronic device is operative to perform an image processing through the image fetching module.

2. The image fetching module of claim 1, further comprising a support device having a socket with the image fetching module secured therein, wherein the connector of the image fetching module is coupled to connector means in the socket, and the support device further comprises a wire extended to electrically couple to a second electronic device so that an image fetching is effected by the image fetching module.

3. The image fetching module of claim 1, further comprising a rail on either side of the recess, a groove on a front portion of each rail, and a slide member and a tab on front and rear portions of either side of the second housing respectively so that the tabs are slidable along the rails, the slide members are slidable along the grooves, and the second housing is positioned after sliding into place.

4. The image fetching module of claim 3, further comprising a stop on a front end of each groove and wherein the first elastic member has one end affixed to each stop and the other end affixed to each tab so that the first and the second housings together are capable of sliding in the recess by compression and expansion of the first elastic member.

5. The image fetching module of claim 1, further comprising a blue-tooth module mounted on the image processing circuit board such that the image fetching module is capable of communicating video information with external devices by wireless.

* * * * *